United States Patent
Demura (10) Patent No.: US 8,468,999 B2
(45) Date of Patent: Jun. 25, 2013

(54) FUEL INJECTION CONTROL SYSTEM OF INTERNAL COMBUSTION ENGINE

(75) Inventor: Takayuki Demura, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 522 days.

(21) Appl. No.: 12/677,842

(22) PCT Filed: Jan. 8, 2009

(86) PCT No.: PCT/IB2009/000016
§ 371 (c)(1),
(2), (4) Date: Mar. 12, 2010

(87) PCT Pub. No.: WO2009/093112
PCT Pub. Date: Jul. 30, 2009

(65) Prior Publication Data
US 2010/0217501 A1  Aug. 26, 2010

(30) Foreign Application Priority Data
Jan. 25, 2008  (JP) .................................. 2008-015182

(51) Int. Cl.
*F02M 51/00* (2006.01)
*F02B 3/00* (2006.01)

(52) U.S. Cl.
USPC ........... 123/299; 123/300; 123/305; 123/492; 701/105; 701/110

(58) Field of Classification Search
USPC .. 123/299–300, 436, 492, 493; 701/103–105, 701/110–111, 114–115
See application file for complete search history.

(56) References Cited

U.S. PATENT DOCUMENTS

| | | | | |
|---|---|---|---|---|
| 6,026,780 A | * | 2/2000 | Barnes et al. | 123/299 |
| 6,082,331 A | * | 7/2000 | Barnes et al. | 123/446 |
| 6,125,823 A | * | 10/2000 | Thomas | 123/464 |
| 6,164,264 A | * | 12/2000 | Thomas | 123/300 |
| 6,328,018 B1 | * | 12/2001 | Akasaka et al. | 123/487 |
| 6,470,849 B1 | * | 10/2002 | Duffy et al. | 123/299 |
| 6,606,974 B1 | * | 8/2003 | Duffy et al. | 123/299 |
| 6,705,278 B2 | * | 3/2004 | McGee et al. | 123/299 |
| 7,093,579 B2 | * | 8/2006 | Dickerson et al. | 123/299 |

(Continued)

FOREIGN PATENT DOCUMENTS

| | | |
|---|---|---|
| DE | 10 2004 021 473 | 11/2005 |
| DE | 10 2004 051 273 | 4/2006 |

(Continued)

*Primary Examiner* — Thomas Moulis
(74) *Attorney, Agent, or Firm* — Oblon, Spivak, McClelland, Maier & Neustadt, L.L.P.

(57) ABSTRACT

A fuel injection control system of an internal combustion engine includes a required injection setting mechanism, a rapid rotational speed change detector, and an injection controller. The required injection setting mechanism calculates a required number of injections and required injection times with regard to a plurality of fuel injections, based on operating conditions of the engine. The rapid rotational speed change detector determines whether the amount of change of the engine speed is equal to or larger than a predetermined value. When it is determined that the amount of change of the engine speed is equal to or larger than the predetermined value, the injection controller controls a fuel injection valve so as to reduce or eliminate differences between the actual injection times and the required injection times. Thereby, even when the engine speed changes rapidly, deteriorations in the driveability and exhaust emissions are prevented.

10 Claims, 5 Drawing Sheets

CASE OF RAPID INCREASE OF ENGINE SPEED

U.S. PATENT DOCUMENTS

| | | | |
|---|---|---|---|
| 7,201,127 B2 * | 4/2007 | Rockwell et al. | 123/179.16 |
| 7,360,522 B2 * | 4/2008 | Tamma et al. | 123/299 |
| 7,415,964 B2 * | 8/2008 | Ban | 123/299 |
| 7,464,689 B2 * | 12/2008 | Siewert | 123/299 |
| 7,533,650 B2 * | 5/2009 | Kim | 123/300 |
| 7,703,440 B2 * | 4/2010 | Hatano et al. | 123/435 |
| 8,027,781 B2 * | 9/2011 | Tanaka et al. | 701/110 |
| 8,261,755 B2 * | 9/2012 | Koyama et al. | 132/299 |
| 2003/0106531 A1 * | 6/2003 | Saeki et al. | 123/435 |
| 2007/0240675 A1 * | 10/2007 | Ban | 123/299 |
| 2010/0139614 A1 * | 6/2010 | Mori et al. | 123/299 |

FOREIGN PATENT DOCUMENTS

| | | |
|---|---|---|
| JP | 4 136451 | 5/1992 |
| JP | 7-42604 | 2/1995 |
| JP | 9 158755 | 6/1997 |
| JP | 9-264169 | 10/1997 |
| JP | 2001 159365 | 6/2001 |
| JP | 2004-28106 | 1/2004 |

* cited by examiner

CASE OF RAPID INCREASE OF ENGINE SPEED

FIG. 5B

CASE OF RAPID DECREASE OF ENGINE SPEED

FIG.6

FUEL INJECTION CONTROL SYSTEM OF INTERNAL COMBUSTION ENGINE

BACKGROUND OF THE INVENTION

1. Field of the Invention

The invention relates to a fuel injection control system of an internal combustion engine in which multiple fuel injections are performed.

2. Description of the Related Art

An internal combustion engine including fuel injection valves for supplying fuel directly into combustion chambers of cylinders is known in the art. When this type of engine having the direct injection type fuel injection valves operates at low temperatures, in particular, atomization of injected fuel is difficult to promote or proceeds at a reduced speed, and its diffusibility tends to deteriorate. In the internal combustion engine having the direct injection type fuel injection valves, therefore, the required amount of the fuel to be injected is not injected from each of the fuel injection valves at a time, but is injected over a plurality of injections (multiple injections) of smaller amounts of fuel at two or more different times on the intake stroke. In this case, the number of injections, injection times (points in time at which the respective injections are performed) and the amount of the fuel to be injected at each injection time, with regard to the multiple injections, are set based on operating conditions of the engine.

In Japanese Patent Application Publication No. 4-136451 (JP-A-4-136451), a fuel injection system is described in which a timer used for starting fuel injection is set at the time of a rise of a crank signal immediately after a cylinder discrimination signal is generated. A technology of determining a transient condition of the engine based on the rate of change of the engine speed is described in Japanese Patent Application Publication No. 2001-159365 (JP-A-2001-159365). With this technology, the time interval of reference position signals is increased when the rate of change of the engine speed is larger than 1, and the interval of reference position signals is reduced when the rate of change of the engine speed is smaller than 1. Japanese Patent Application Publication No. 9-158755 (JP-A-9-158755) describes a technology of accurately controlling the injection completion time with respect to the crank angle, by correcting the injection period in view of a change of the rotational speed of the engine when it changes from the time of generation of an injection command to the actual injection.

When multiple injections are performed, however, a rapid change in the rotational speed of the engine results in a large deviation of the actual fuel injection time of each of the multiple injections from the initially set fuel injection time (required injection time). Because of the deviation of the injection times, the actual amount of fuel deposited in the cylinder may differ from the assumed fuel deposition amount at the required injection time, or the amount of fuel returning into the intake system may vary, thus causing a difference between the amount of fuel actually used for combustion and the amount of fuel assumed, in a design stage, to be used for combustion. The difference in the amount of the fuel may also affect the air-fuel ratio of the resulting mixture, and, at worst, may result in misfiring. For these reasons, when the rotational speed of the engine changes rapidly, there arise possibilities of deteriorations in the driveability and/or exhaust emissions.

SUMMARY OF THE INVENTION

The invention provides a fuel injection control system of an internal combustion engine in which multiple injections are performed, wherein the driveability and exhaust emissions are less likely to deteriorate even when the rotational speed of the internal combustion engine changes rapidly.

A first aspect of the invention is concerned with a fuel injection control system of an internal combustion engine, including a fuel injection valve operable to inject fuel directly into a cylinder and perform a plurality of fuel injections on an intake stroke, and crank angle signal generating means for generating a detection signal each time a predetermined crank angle is reached. The fuel injection control system includes: required injection setting means for calculating a required number of injections and required injection times with regard to the above-indicated plurality of fuel injections, based on operating conditions of the internal combustion engine; rapid rotational speed change detecting means for determining whether an amount of change of a rotational speed of the internal combustion engine is equal to or larger than a predetermined value, based on the detection signal received from the crank angle signal generating means; rapid-change-time required injection setting means for replacing the required injection setting means to recalculate the required number of injections and the required injection times with regard to the plurality of fuel injections, when the rapid rotational speed change detecting means determines that the amount of change of the rotational speed of the internal combustion engine is equal to or larger than the predetermined value; and injection control means for controlling fuel injection of the fuel injection valve to suppress the difference between actual injection times and the required injection times.

A second aspect of the invention is concerned with a fuel injection control system of an internal combustion engine, including a fuel injection valve operable to inject fuel directly into a cylinder and perform a plurality of fuel injections on an intake stroke, and crank angle signal generating means for generating a detection signal each time a predetermined crank angle is reached. The fuel injection control system includes: required injection setting means for calculating a required number of injections and required injection times with regard to the above-indicated plurality of fuel injections, based on operating conditions of the internal combustion engine; rapid rotational speed change detecting means for determining whether an amount of change of a rotational speed of the internal combustion engine is equal to or larger than a predetermined value, based on the detection signal received from the crank angle signal generating means; rapid-change-time required injection setting means for replacing the required injection setting means to recalculate the required number of injections and the required injection times with regard to the plurality of fuel injections, when the rapid rotational speed change detecting means determines that the amount of change of the rotational speed of the internal combustion engine is equal to or larger than the predetermined value; and injection control means for controlling fuel injection of the fuel injection valve based on the results of calculation of the required injection setting means and the rapid-change-time required injection setting means.

In the fuel injection control system, the crank angle signal generating means is in the form of, for example, a crank angle sensor. In the fuel injection control system of the internal combustion engine as described above, the required injection setting means, rapid rotational speed change detecting means and the injection control means are implemented by, for example, ECU (Electronic Control Unit). In this system, fuel injection of the fuel injection valve is controlled based on the result of calculation of the required injection setting means and that of the rapid-change-time required injection setting means, so that deteriorations in the driveability and exhaust emissions can be prevented even where the engine speed changes rapidly.

In the fuel injection control system according to the above aspects of the invention, the rapid-change-time required injection setting means may convert each of the required injection times into an elapsed time from a signal-receiving point of receiving the detection signal immediately before reaching each of the required injection times. The injection control means may cause the fuel injection valve to inject fuel when the elapsed time elapses from the signal-receiving point of receiving the detection signal immediately before reaching each of the required injection times. With this arrangement, even when the engine speed changes rapidly, deviations or differences in crank angle between the required injection times and the actual injection times are reduced or eliminated, and deteriorations in the driveability and exhaust emissions are suppressed or prevented even when the engine speed changes rapidly.

In the fuel injection control system according to the above aspects of the invention, the rapid-change-time required injection setting means may set the required number of injections and the required injection times, based on signal-receiving points in time at which respective detection signals are received from the crank angle signal generating means. The injection control means may cause the fuel injection valve to inject the fuel at selected ones of the signal-receiving points of the respective detection signals received from the crank angle signal generating means. With this arrangement, even when the engine speed changes rapidly, deviations or differences in crank angle between the required injection times and the actual injection times are reduced or eliminated, and deteriorations in the driveability and exhaust emissions are suppressed or prevented. Furthermore, the processing is more simply carried out, and the load on CPU can be reduced.

In the fuel injection control system according to the above aspects of the invention, the rapid-change-time required injection setting means may reduce the required number of injections, and then recalculates the required injection times. The injection control means may cause the fuel injection valve to inject the fuel at the required injection times that have been recalculated by the rapid-change-time required injection setting means. With this arrangement, too, deviations or differences in crank angle between the required injection times and the actual injection times are reduced or eliminated.

In the fuel injection control system as described just above, the rapid-change-time required injection setting means may be activated when the rotational speed of the internal combustion engine increases rapidly.

In the fuel injection control system according to the first aspects of the invention, the rapid-change-time required injection setting means may set the first required injection time, out of the above-indicated plurality of fuel injections, to the required injection time calculated by the required injection setting means.

A third aspect of the invention is concerned with a fuel injection control method of an internal combustion engine. The fuel injection control method includes the steps of calculating a required number of injections and required injection times with regard to a plurality of fuel injections, based on operating conditions of the internal combustion engine; determining whether an amount of change of a rotational speed of the internal combustion engine is equal to or larger than a predetermined value, based on a detection signal received from crank angle signal generating means; recalculating the required number of injections and the required injection times with regard to the plurality of fuel injections when it is determined that the amount of change of the rotational speed of the internal combustion engine is equal to or larger than the predetermined value; and controlling fuel injection of a fuel injection valve based on the result of calculation of the required number of injections and the required injection times.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Preferred embodiments of the invention will be described with reference to the drawings.

Figure 1:
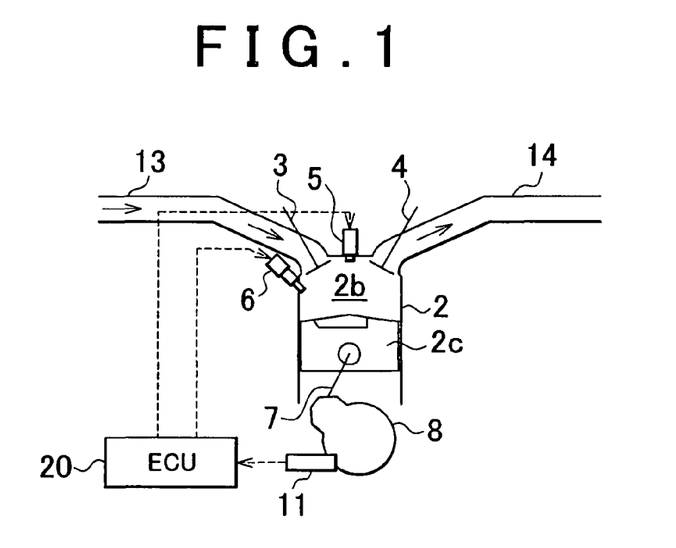
FIG. 1 is a view showing the construction of an internal combustion engine having a fuel injection control system according to each embodiment of the invention.

FIG. 1 is a view showing the general construction of an internal combustion engine having a fuel injection control system according to each of the embodiments of the invention. The internal combustion engine (which will simply be called "engine") is provided with a plurality of cylinders 2. An intake passage 13 and an exhaust passage 14 are connected to a combustion chamber 2b of each of the cylinders 2. The engine is a direct or in-cylinder injection type engine, and a fuel injection valve 6 is provided in each cylinder 2 for directly injecting fuel into the combustion chamber 2b. An ignition plug 5 is provided in a head portion of the cylinder 2.

The combustion chamber 2b is provided with an intake valve 3 and an exhaust valve 4. The intake valve 3 is opened and closed so as to allow and inhibit fluid communication between the intake passage 13 and the combustion chamber 2b. Also, the exhaust valve 4 is opened and closed so as to allow and inhibit fluid communication between the exhaust passage 14 and the combustion chamber 2b.

In operation, intake air to be supplied to the combustion chamber 2b of the cylinder 2 flows through the intake passage 13. In the combustion chamber 2b, fuel is injected from the fuel injection valve 6, and is fired or ignited by the ignition plug 5, so that a mixture of the supplied intake air and fuel is burned. The combustion of the air-fuel mixture causes a piston 2c to reciprocate in the cylinder 2. The reciprocating motion is transmitted to a crankshaft 8 via a connecting rod 7, to rotate the crankshaft 8. The ignition plug 5 and the fuel injection valve 6 are controlled according to control signals from an ECU (Electronic Control Unit) 20. Exhaust gas generated as a result of the combustion in the combustion chamber 2b is discharged into the exhaust passage 14. A crank angle sensor 11 is installed in the vicinity of the crankshaft 8. The crank angle sensor 11 generates a detection signal each time the crankshaft 8 rotates a predetermined crank angle (e.g., 30° CA), and transmits the detection signal to the ECU 20.

The ECU 20 includes CPU (Central Processing Unit), ROM (Read Only Memory) and RAM (Random Access Memory), which are not illustrated, and so forth. The ECU 20 acquires detection signals from various sensors provided in the engine, and performs control on the engine based on the acquired signals. More specifically, the ECU 20 acquires detection signals from various sensors, such as the above-mentioned crank angle sensor 11, an air flow meter (not shown) for detecting the intake air quantity, and a throttle position sensor (not shown) for detecting the throttle opening, and determines operating conditions of the engine, based on the detection signals. Then, the ECU 20 performs driving control of, for example, the ignition plug 5 and the fuel injection valve 6, based on the thus determined operating conditions of the engine.

The internal combustion engine to which the invention is applicable is not limited to a gasoline engine, but may be a diesel engine.

In the direct injection type engine in which the fuel is directly injected from the fuel injection valve into each cylinder, as shown in FIG. 1, at low operating temperatures, for example, atomization of the injected fuel proceeds at a reduced speed and its diffusibility tends to deteriorate, which may result in increased smoke, reduction of the engine power, and/or other problems. In the direct injection type engine, therefore, the required amount of fuel, which is determined according to the operating conditions of the engine, such as the engine load, is not injected at a time, but is injected through multiple injections of smaller amounts of fuel at two or more different times on the intake stroke, thus assuring sufficient diffusibility of the injected fuel. More specifically, the ECU 20 calculates parameters (such as a required injection amount, required number of injections and required injection times or timing), and transmits driving signals corresponding to the calculated parameters to the fuel injection valve 6, so as to control the fuel injection valve 6.

Figure 2:
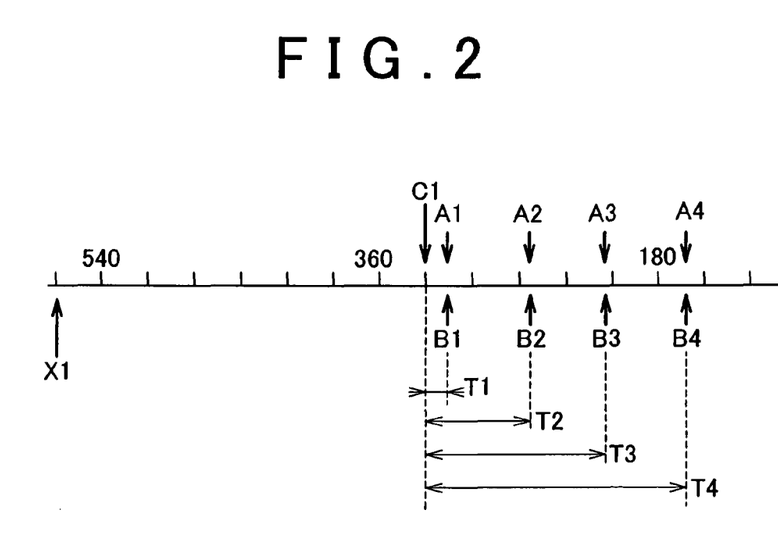
FIG. 2 is a schematic view showing fuel injection times relative to the crank angle when the engine speed is constant, which times are determined according to a general fuel injection control method.

A general fuel injection control method for performing driving control of the fuel injection valve 6 will be explained with reference to FIG. 2. FIG. 2 is a schematic view showing fuel injection times relative to the crank angle, which are determined by the general fuel injection control method. More specifically, FIG. 2 is a schematic view showing fuel injection times relative to the crank angle when the engine speed is constant.

In the following example, the crank angle sensor 11 is supposed to transmit a detection signal to the ECU 20 each time the crank angle is changed by 30° CA. In FIG. 2, the numeral values on the straight line indicate crank angles represented by BTDC (before top dead center) angles, and the straight line is marked in 30° increments which corresponds to the frequency at which the ECU 20 receives detection signals from the crank angle sensor 11. On the straight line of FIG. 2, points A1-A4 indicate required injection times calculated based on the operating conditions of the engine, and points B1-B4 indicate actual injection times.

Referring to FIG. 2, the case where the engine speed is kept constant will be described. At time X1 (for example, when the crank angle is 570° BTDC), the ECU 20 calculates the parameters (such as the required injection amount, required number of injections, and the required injection times) of the fuel injected from the fuel injection valve 6, based on the operating conditions of the engine. For calculation of the required injection times, for example, the ECU 20 calculates required injection times A1-A4 in terms of respective crank angles, based on the operating conditions of the engine. In the following, the required injection times A1-A4 are represented by crank angles (before top dead center).

Subsequently, the ECU 20 converts the required injection times A1-A4 into elapsed times T1-T4 from a signal-receiving point C1 at which it receives a detection signal immediately before reaching the first required injection time A1 of multiple injections. More specifically, the ECU 20 constantly measures time it takes from the time when the crank angle sensor 11 receives a certain detection signal to the time when it receives the next detection signal, namely, a period of time required for the crank angle to advance by 30° CA (which will be called "unit crank angle advancement period"). Thus, the ECU 20 converts the required injection times A1-A4 into the elapsed times T1-T4 from the signal-receiving point C1 at which it receives the detection signal immediately before reaching the first required injection time A1 of the multiple injections, based on the unit crank angle advancement period determined at time X1. The elapsed times T1-T4 from the signal-receiving point C1 thus obtained provide the actual injection times B1-B4. Thus, in the following description, the actual injection times B1-B4 will be represented by time.

Then, the ECU 20 performs fuel injection control so that fuel is injected from the fuel injection valve 6 at the actual injection times B1-B4, namely, when the elapsed times T1-T4 have elapsed from the signal-receiving point C1 of the detection signal immediately before the required injection time A1.

As is understood from the above description, the ECU 20 converts the required injection times A1-A4 into the elapsed times T1-T4 from the signal-receiving point C1 at which it receives the detection signal immediately before reaching the required injection time A1, based on the unit crank angle advancement period determined at time X1, so as to determine the actual injection times B1-B4. Accordingly, when the engine speed is kept constant over a period between time X1 and time C1, the crank angles corresponding to the actual injection times B1-B4 substantially coincide with the required injection times A1-A4, respectively, as shown in FIG. 2.

However, if the engine speed changes rapidly during the period between time X1 and time C1, the crank angles corresponding to the actual injection times B1-B4 largely deviate from the required injection times A1-A4.

Figure 3A:
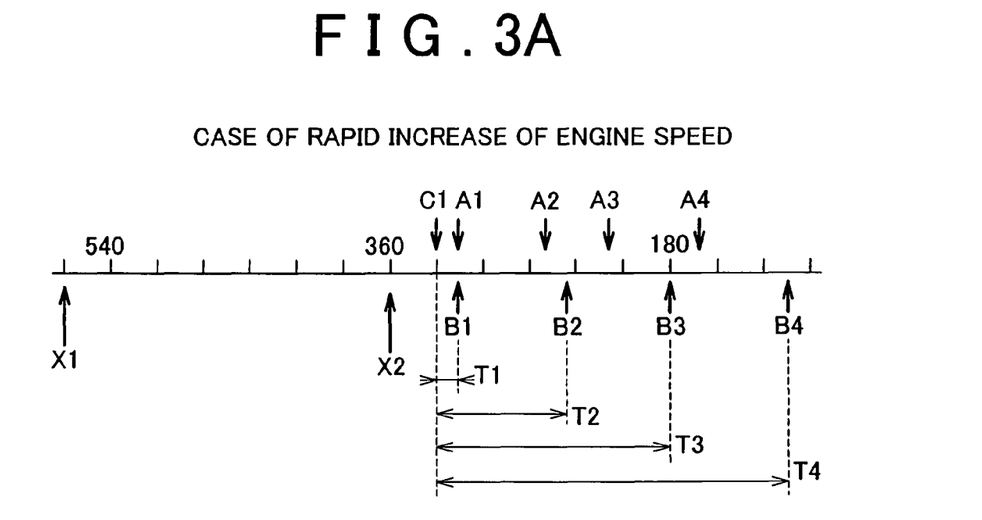
FIG. 3A and FIG. 3B are schematic views each showing fuel injection times relative to the crank angle when the engine speed changes rapidly, which times are determined according to the general fuel injection control method.
Figure 3B:
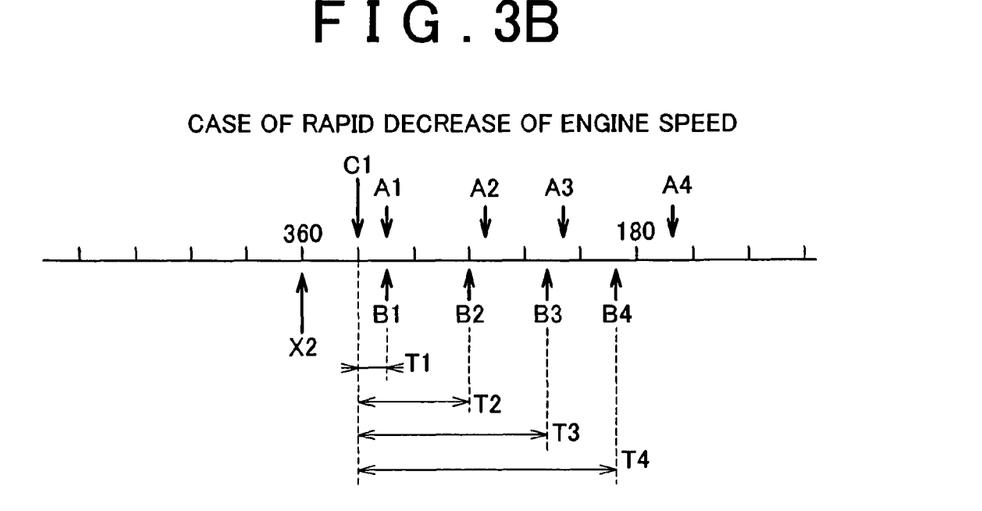

FIG. 3A is a schematic view showing fuel injection times relative to the crank angle in the case where the engine speed increases rapidly, and FIG. 3B is a schematic view showing fuel injection times relative to the crank angle in the case where the engine speed decreases rapidly.

When the engine speed increases rapidly during the period between time X1 and time C1, for example, the actual injection times B1-B4 into which the required injection times A1-A4 are converted based on the unit crank angle advancement period determined at time X1 are delayed in terms of the crank angle, relative to the required injection times A1-A4, as shown in FIG. 3A. This is because the engine speed measured at time C1 becomes higher than the engine speed measured at time X1, and therefore, the unit crank angle advancement period determined at time C1 becomes shorter than the unit crank angle advancement period determined at time X1.

When the engine speed decreases rapidly during the period between time X1 and time C1, on the other hand, the actual injection times B1-B4 into which the required injection times A1-A4 are converted based on the unit crank angle advancement period determined at time X1 are advanced in terms of the crank angle, relative to the required injection times A1-A4, as shown in FIG. 3B. This is because the engine speed measured at time C1 becomes lower than the engine speed measured at time X1, and therefore, the unit crank angle advancement period determined at time C1 becomes longer than the unit crank angle advancement period determined at time X1.

Since the actual injection times B1-B4 are calculated by converting the required injection times A1-A4 into elapsed times T1-T4 from the signal-receiving point C1 of the detection signal immediately before the required injection time A1, a deviation of the actual injection time B1 from the required injection time A1 in terms of the crank angle is small, but a deviation of the actual injection time from the required injection time in terms of the crank angle gradually increases from that of the actual injection time B1 to that of the actual injection time B4, namely, as the number of the actual injections increases, as shown in FIG. 3A and FIG. 3B.

If the actual injection time largely deviates from the required injection time in terms of the crank angle, as described above, the actual amount of fuel deposited in the cylinder may differ from the fuel deposition amount at the required injection time, and the amount of fuel returning into the intake system may vary, thus causing a difference between the amount of fuel actually used for combustion and the amount of fuel assumed in a design stage to be used for combustion. Also, the difference between the actual fuel amount and the designed fuel amount affects conditions of a mixture of the fuel and air, and may result in misfiring. For these reasons, the driveability and/or exhaust emissions may deteriorate when the engine speed changes rapidly.

In the fuel injection control method according to the present invention, therefore, the ECU 20 determines whether the amount of change of the engine speed is equal to or larger than a predetermined value, based on the detection signals from the crank angle sensor 11, and, when determining that the amount of change of the engine speed is equal to or larger than the predetermined value, the ECU 20 controls the fuel injection valve 6 so as to reduce or eliminate a deviation of the actual injection time from the required injection time in terms of the crank angle. The ECU 20 corresponds to the fuel injection control system of the invention. More specifically, the ECU 20 corresponds to the required injection setting means, rapid rotational speed change detecting means, and the injection control means. The fuel injection control method according to the present invention makes it possible to suppress or prevent deteriorations in the driveability and/or exhaust emissions even when the engine speed changes rapidly. This method will be specifically described in each of the following embodiments of the invention.

Figure 4A:
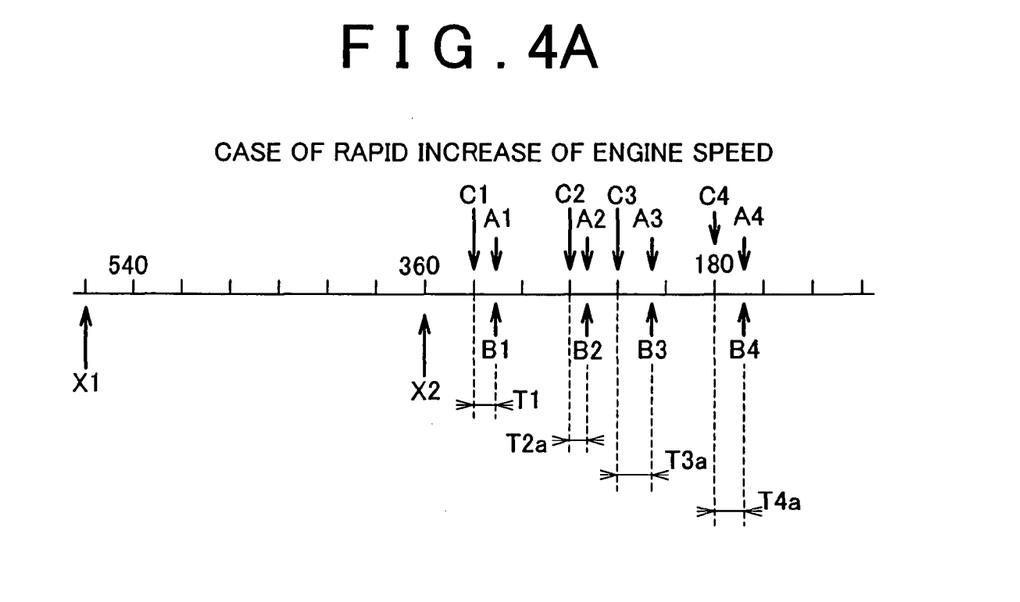
FIG. 4A and FIG. 4B are schematic views each showing fuel injection times relative to the crank angle, which are determined according to a fuel injection control method of a first embodiment of the invention.
Figure 4B:
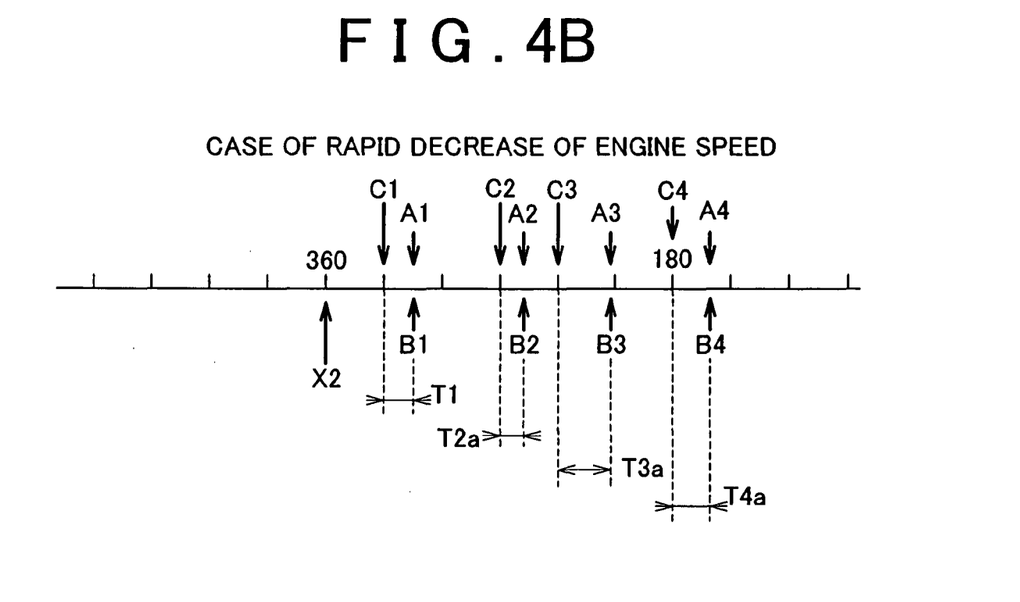

As one example of the fuel injection control method of the invention, a fuel injection control method according to a first embodiment of the invention will be described with reference to FIG. 4A and FIG. 4B. FIG. 4A and FIG. 4B are schematic views showing fuel injection times relative to the crank angle, which are determined according to the fuel injection control method of the first embodiment. More specifically, FIG. 4A is a schematic view showing fuel injection times relative to the crank angle in the case where the engine speed increases rapidly, and FIG. 4B is a schematic view showing fuel injection times relative to the crank angle in the case where the engine speed decreases rapidly.

When the ECU 20 determines that the amount of change of the engine speed is equal to or larger than a predetermined value, based on the detection signals from the crank angle sensor 11, the ECU 20 converts the required injection times A2-A4 into elapsed times from respective signal-receiving points C2-C4 at which it receives detection signals immediately before reaching the required injection times A2-A4, respectively, so as to determine the actual injection times B2-B4. This method will be described in more detail below, referring to FIG. 4A and FIG. 4B.

At time X1 (for example, at 570° BTDC), the ECU 20 calculates the parameters of the fuel injected from the fuel injection valve 6, based on the operating conditions of the engine. At this time, the ECU 20 calculates the actual injection times B1-B4 as elapsed times T1-T4 from the signal-receiving point C1 at which it receive a detection signal immediately before reaching the first required injection time A1 of multiple injections, as described above with reference to FIG. 2.

Subsequently, the ECU 20 determines whether the engine speed has changed rapidly, at the signal-receiving point C1 at which it receives the detection signal immediately before reaching the first required injection time A1 of multiple injections. More specifically, the ECU 20 determines whether an absolute value of a difference between the engine speed measured at time X1 and the engine speed measured at time C1 is equal to or larger than a predetermined value, namely, whether the engine speed has increased rapidly or has decreased rapidly. Here, the ECU 20 may determine whether an absolute value of a difference between the engine speed measured at time X1 and the engine speed measured at time X2 (for example, 360° BTDC) at which it receives a detection signal immediately before reaching time C1 is equal to or larger than a predetermined value, rather than determining whether the absolute value of the difference between the engine speed measured at time X1 and the engine speed measured at time C1 is equal to or larger than the predetermined value. The above-indicated predetermined value is determined in advance via an experiment, or the like, and is stored in the ROM of the ECU 20.

When the ECU 20 determines that the absolute value of the difference between the engine speed measured at time X1 and the engine speed measured at time C1 is equal to or larger than the predetermined value (or when the ECU 20 determines that the absolute value of the difference between the engine speed measured at time X1 and the engine speed measured at time X2 at which it receives a detection signal immediately before reaching time C1 is equal to or larger than the predetermined value), the ECU 20 recalculates the actual injection times B2-B4 by converting the required injection times A2-A4 again into elapsed times from the respective signal-receiving points C2-C4 at which it receives detection signals immediately before reaching the required injection times A2-A4, respectively.

With regard to the actual injection time B1, the elapsed time T1 from the signal-receiving point C1 at which it receives a detection signal immediately before reaching the required injection time A1 is used as it is as the actual injection time B1. This is because a deviation of the actual injection time B1 that has not been recalculated from the required injection time A1 in terms of the crank angle is small, as compared with the other injection times (B2-B4), as described above. However, at the signal-receiving point C1 at which the ECU 20 receives a detection signal immediately before reaching the required injection time A1, the ECU 20 may recalculate the actual injection time B1 by converting the elapsed time T1 from the signal-receiving point C1 which was calculated at time X1, into an elapsed time from the signal-receiving point C1, based on the unit crank angle advancement period determined at the signal-receiving point C1, in the same manner as that of determining the other injection times.

At a signal-receiving point C2 at which the ECU 20 receives a detection signal immediately before reaching the required injection time A2, the ECU 20 calculates the actual injection time B2, by converting the elapsed time T2 from the signal-receiving point C1 which was calculated at time X1, into an elapsed time T2a from the signal-receiving point C2, based on the unit crank angle advancement period determined at the signal-receiving point C2. In other words, the actual injection time B2 is obtained by calculating a difference between the crank angles corresponding to the required injection time A2 and the signal-receiving point C2, as the elapsed time T2a from the signal-receiving point C2, based on the engine speed measured at the signal-receiving point C2.

Similarly, at a signal-receiving point C3 at which the ECU 20 receives a detection signal immediately before reaching the required injection time A3, the ECU 20 calculates the actual injection time B3, by converting the elapsed time T3 from the signal-receiving point C1 which was calculated at time X1, into an elapsed time T3a from the signal-receiving point C3, based on the unit crank angle advancement period determined at the signal-receiving point C3. At a signal-receiving point C4 at which the ECU 20 receives a detection signal immediately before reaching the required injection time A4, the ECU 20 calculates the actual injection time B4, by converting the elapsed time T4 from the signal-receiving point C1 which was calculated at time X1, into an elapsed time T4a from the signal-receiving point C4, based on the unit crank angle advancement period determined at the signal-receiving point C4.

The ECU 20 controls fuel injection of the fuel injection valve 6 so that fuel is injected from the fuel injection valve 6 at the actual injection times B1-B4, namely, at the time when the elapsed time T1 has elapsed from the signal-receiving point C1, the time when the elapsed time T2a has elapsed from the signal-receiving point C2, the time when the elapsed time T3a has elapsed from the signal-receiving point C3, and the time when the elapsed time T4a has elapsed from the signal-receiving point C4, respectively. In this manner, even in the case where the engine speed increases rapidly (FIG. 4A) or the case where the engine speed decreases rapidly (FIG. 4B), a deviation or difference in crank angle between the actual injection time and the required injection time is reduced or eliminated, as compared with that arising in the above-described general fuel injection control method.

Namely, the fuel injection control method of the first embodiment is different from the general fuel injection control method in that the required injection times are converted into lengths of time elapsed from the respective signal-receiving points at which the ECU 20 receive detection signals immediately before reaching the respective required injection times, so that substantially no deviation or difference in crank angle arises between the required injection time and the corresponding actual injection time.

According to the fuel injection control method of the first embodiment as described above, even when the engine speed changes rapidly, a deviation or difference in crank angle between the actual injection time and the required injection time is reduced or eliminated, as compared with that arising in the general fuel injection control method, and otherwise possible deteriorations in the driveability and exhaust emissions are suppressed or prevented.

Figure 5A:
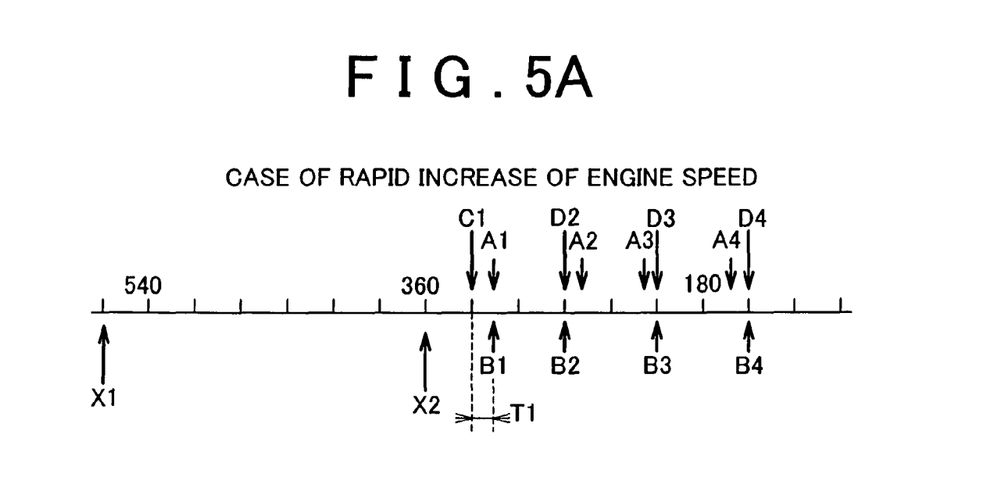
FIG. 5A and FIG. 5B are schematic views each showing fuel injection times relative to the crank angle, which are determined according to a fuel injection control method of a second embodiment of the invention.
Figure 5B:
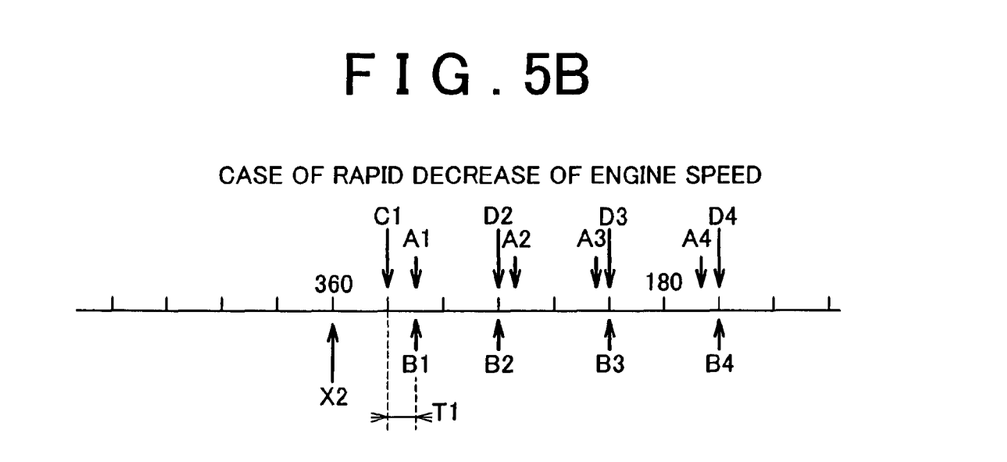

As another example of the fuel injection control method of the invention, a fuel injection control method according to a second embodiment of the invention will be described with reference to FIG. 5A and FIG. 5B. FIG. 5A is a schematic view showing fuel injection times relative to the crank angle in the case where the engine speed increases rapidly, and FIG. 5B is a schematic view showing fuel injection times relative to the crank angle in the case where the engine speed decreases rapidly.

In the fuel injection control method according to the second embodiment, when the ECU 20 determines that the amount of change of the engine speed in a period between time X1 and time C1 is equal to or larger than a predetermined value, based on the detection signals from the crank angle sensor 11, the ECU 20 determines signal-receiving points at which it receives detection signals closest to the respective required injection times A2-A4, as the actual injection times B2-B4, respectively. This method will be described in more detail below, with reference to FIG. 5A and FIG. 5B.

The ECU 20 calculates the parameters of the fuel injected from the fuel injection valve 6, based on the operating conditions of the engine, at time X1 (for example, at 570° BTDC), and calculates the actual injection times B1-B4 as elapsed times T1-T4 from the signal-receiving point C1 at which it receives a detection signal immediately before reaching the first required injection time A1 of multiple injections, as described above with reference to FIG. 2. Then, at the signal-receiving point C1 at which the ECU 20 receives the detection signal immediately before reaching the first required injection time A1 of multiple injections, the ECU 20 determines whether an absolute value of a difference between the engine speed measured at time X1 and the engine speed measured at time C1 is equal to or larger than a predetermined value, namely, whether the engine speed increases rapidly or decreases rapidly. Here, the ECU 20 may determine whether an absolute value of a difference between the engine speed measured at time X1 and the engine speed measured at a signal-receiving point X2 (for example, 360° BTDC) at which it receives a detection signal immediately before reaching time C1 is equal to or larger than a predetermined value, rather than determining whether the absolute value of the difference between the engine speed measured at time X1 and the engine speed measured at time C1 is equal to or larger than the predetermined value.

When the ECU 20 determines that the absolute value of the difference between the engine speed measured at time X1 and the engine speed measured at time C1 is equal to or larger than the predetermined value, the ECU 20 recalculates the actual injection times B2-B4 by setting the actual injection times B2-B4 to respective signal-receiving points at which it receives detection signals closest to the respective required injection times A2-A4. Namely, the ECU 20 sets the actual injection time B2 to a signal-receiving point D2 at which it receives a detection signal closest to the required injection time A2, sets the actual injection time B3 to a signal-receiving point D3 at which it receives a detection signal closest to the required injection time A3, and sets the actual injection time B4 to a signal-receiving point D4 at which it receives a detection signal closest to the required injection time A4. With regard to the actual injection time B1, the elapsed time T1 from the signal-receiving point C1 at which the ECU 20 receives the detection signal immediately before reaching the required injection time A1 is used as it is as the actual injection time B1. This is because a deviation of the actual injection time B1 that has not been recalculated from the required injection time A1 in terms of the crank angle is small, as compared with those of the other injection times, as described above. However, the ECU 20 may set the actual injection time B1 to the signal-receiving point C1 at which it receives a detection signal closest to the required injection time A1, in the same manner as that of setting the other injection times.

By setting the actual injection times to the signal-receiving points at which the ECU receives the detection signals closest to the respective required injection times, it is possible to reduce or eliminate a deviation or difference in crank angle between the actual injection time and the required injection time even in the case where the engine speed increases rapidly (FIG. 5A) or the case where the engine speed decreases rapidly (FIG. 5B), as compared with that arising in the general fuel injection control method.

According to the fuel injection control method according to the second embodiment as described above, even when the engine speed changes rapidly, a deviation or difference in crank angle between the actual injection time and the required injection time is reduced or eliminated, as compared with that arising in the general fuel injection control method, and otherwise possible deteriorations in the driveability and exhaust emissions can be suppressed or prevented. Also, the fuel injection control method of the second embodiment can be implemented more simply than that of the first embodiment, and therefore, the load on the CPU of the ECU 20 can be reduced.

Figure 6:
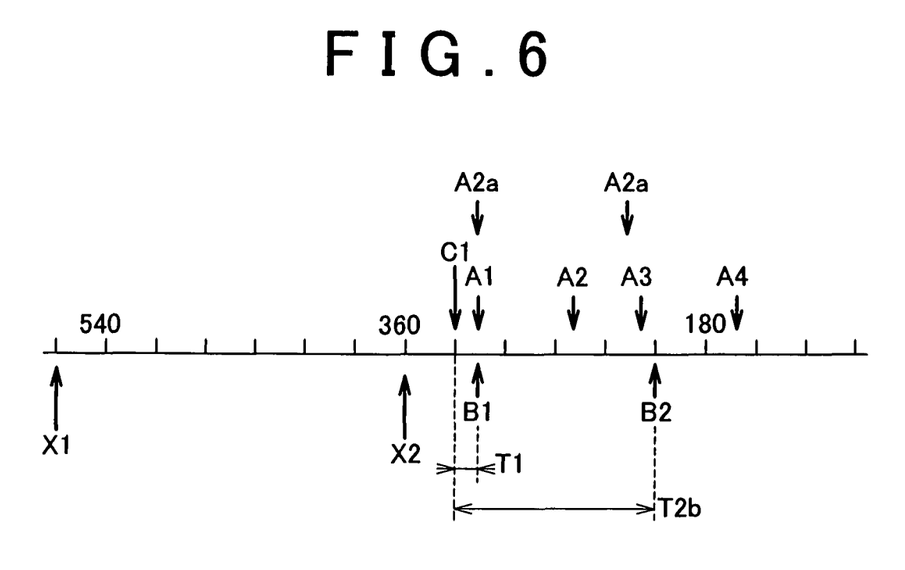
FIG. 6 is a schematic view showing fuel injection times relative to the crank angle, which are determined according to a fuel injection control method of a third embodiment of the invention.

As a further example of the fuel injection control method of the invention, a fuel injection control method according to a third embodiment of the invention will be described with reference to FIG. 6. FIG. 6 is a schematic view showing fuel injection times relative to the crank angle, which are determined according to the fuel injection control method of the third embodiment. More specifically, FIG. 6 is a schematic view showing fuel injection times relative to the crank angle when the engine speed increases rapidly.

In the fuel injection control method of the third embodiment, when the ECU 20 determines that the amount of change of the engine speed is equal to or larger than a predetermined value, based on the detection signals from the crank angle sensor 11, the ECU 20 reduces the required number of fuel injections, and then recalculates the required injection times, so that the fuel is injected from the fuel injection valve 6 at the required injection times that have been recalculated. This method will be described in more detail with reference to FIG. 6.

The ECU 20 calculates the parameters, such as the required number of injections and the required injection times, of the fuel injected from the fuel injection valve 6, based on the operating conditions of the engine, at time X1 (for example, at 570° BTDC), and calculates the actual injection times B1-B4 as elapsed times T1-T4 from a signal-receiving point C1 at which the ECU 20 receives a detection signal immediately before reaching the first required injection time A1 of multiple injections, as described above with reference to FIG. 2.

At the signal-receiving point C1 at which the ECU 20 receives the detection signal immediately before reaching the first required injection time A1 of multiple injections, the ECU 20 determines whether an absolute value of a difference between the engine speed measured at time X1 and the engine speed measured at time C1 is equal to or larger than a predetermined value, namely, whether the engine speed increases rapidly or decreases rapidly, or not. Here, the ECU 20 may determine whether an absolute value of a difference between the engine speed measured at time X1 and the engine speed measured at a signal-receiving point X2 (for example, 360° BTDC) at which it receives a detection signal immediately before reaching the above-indicated time C1 is equal to or larger than a predetermined value, rather than determining whether the absolute value of the difference between the engine speed measured at time X1 and the engine speed measured at time C1 is equal to or larger than the predetermined value.

In the third embodiment, the ECU 20 also calculates the required number of injections for the case where the engine speed changes rapidly, based on the operating conditions of the engine. The required number of injections for the case where the engine speed changes rapidly is calculated so as to be reduced to be smaller than the number of injections (four in this example) represented by the previously calculated required injection times. In the example as shown in FIG. 6, for example, the required number of injections is set to two, which is smaller than four.

Then, the ECU 20 determines whether the absolute value of the difference between the engine speed measured at time X1 and the engine speed measured at time C1 is equal to or larger than the predetermined value, at the signal-receiving point C1 at which it receives a detection signal immediately before reaching the first required injection time A1 of multiple injections.

If the ECU 20 determines that the absolute value of the difference between the engine speed measured at time X1 and the engine speed measured at time C1 is equal to or larger than the predetermined value, the required injection times are calculated again, based on the required number of injections determined for the case where the engine speed changes rapidly, which was calculated at time X1.

In the example shown in FIG. 6 in which the required number of injections for the case where the engine speed changes rapidly is set to two, the ECU 20 reduces the required number of injections A1-A4 from four to two, and then recalculates the required injection times A1a, A2a, based on the operating conditions of the engine. To be more precise, the ECU 20 recalculates the required injection time(s) of the second and subsequent ones (the second one in this embodiment) of multiple injections. Thus, in the example as shown in FIG. 6, the ECU 20 recalculates the required injection time A2a of the second one of multiple injections.

Then, the ECU 20 calculates the actual injection time B2 by converting the required injection time A2a into an elapsed time T2b from the signal-receiving point C1 at which it receives a detection signal immediately before reaching the first required injection time A1a of multiple injections. In other words, the actual injection time B2 is obtained by converting a difference in crank angle between the required injection time A2a and the signal-receiving point C1, into the elapsed time T2b from the signal-receiving point C1, based on the engine speed measured at the signal-receiving point C1. In the meantime, the first required injection time A1a of multiple injections is regarded as not largely deviating from the required injection time A1, and the elapsed time T1 is used as it is as the actual injection time B1. This is because a deviation or a difference in crank angle between the actual injection time B1 that has not been recalculated and the required injection time A1 is small, as compared with those of the other injection times, as described above.

The fuel injection control method of the third embodiment is different from the general fuel injection control method in that the required number of injections is reduced by one, or two or more, thereby to suppress or prevent deterioration in the accuracy of the actual injection times of, in particular, the second and subsequent injections. If the required number of injections is set to one, namely, if only the required injection time A1*a* is employed, variations in the injection start time can be reduced since a difference in crank angle between the actual injection time B1 and the required injection time A1 is small.

While the example as shown in FIG. 6 corresponds to the case where the engine speed increases rapidly, the above-described method may be equally applied to the case where the engine speed decreases sharply. Namely, even where the engine speed decreases sharply, the required number of injections may be reduced by one, or two or more, so as to suppress deterioration in the accuracy of the required injection times.

According to the fuel injection control method of the third embodiment as described above, too, in the case where the amount of change of the engine speed changes rapidly, a deviation or difference in crank angle between the required injection time and the actual injection time is reduced or eliminated, as compared with that arising in the general fuel injection control method, and otherwise possible deteriorations in the driveability and exhaust emissions can be suppressed or prevented.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel injection control system of an internal combustion engine including a fuel injection valve operable to inject fuel directly into a cylinder and perform a plurality of fuel injections on an intake stroke, and a crank angle signal generating portion that generates a detection signal each time a predetermined crank angle is reached, comprising:
   a required injection setting portion that calculates a required number of injections and required injection times with regard to said plurality of fuel injections, based on operating conditions of the internal combustion engine;
   a rapid rotational speed change detecting portion that determines whether an amount of change of a rotational speed of the internal combustion engine is equal to or larger than a predetermined value, based on the detection signal received from the crank angle signal generating means;
   a rapid-change-time required injection setting portion that replaces the required injection setting portion to recalculate the required number of injections and the required injection times with regard to said plurality of fuel injections, when the rapid rotational speed change detecting portion determines that the amount of change of the rotational speed of the internal combustion engine is equal to or larger than the predetermined value; and
   an injection control portion that controls fuel injection of the fuel injection valve to suppress the difference between actual injection times and the required injection times, wherein:
   the rapid-change-time required injection setting portion converts each of the required injection times into an elapsed time from a signal-receiving point of receiving the detection signal immediately before reaching said each of the required injection times; and
   the injection control portion causes the fuel injection valve to inject fuel when the elapsed time elapses from the signal-receiving point of receiving the detection signal immediately before reaching said each of the required injection times.

2. The fuel injection control system of an internal combustion engine including a fuel injection valve operable to inject fuel directly into a cylinder and perform a plurality of fuel injections on an intake stroke, and a crank angle signal generating portion that generates a detection signal each time a predetermined crank angle is reached, comprising:
   a required injection setting portion that calculates a required number of injections and required injection times with regard to said plurality of fuel injections, based on operating conditions of the internal combustion engine;
   a rapid rotational speed change detecting portion that determines whether an amount of change of a rotational speed of the internal combustion engine is equal to or larger than a predetermined value, based on the detection signal received from the crank angle signal generating means;
   a rapid-change-time required injection setting portion that replaces the required injection setting portion to recalculate the required number of injections and the required injection times with regard to said plurality of fuel injections, when the rapid rotational speed change detecting portion determines that the amount of change of the rotational speed of the internal combustion engine is equal to or larger than the predetermined value; and
   an injection control portion that controls fuel injection of the fuel injection valve to suppress the difference between actual injection times and the required injection times, wherein:
   the rapid-change-time required injection setting portion sets the required number of injections and the required injection times, based on signal-receiving points in time at which respective detection signals are received from the crank angle signal generating portion; and
   the injection control portion causes the fuel injection valve to inject the fuel at selected ones of the signal-receiving points of the respective detection signals received from the crank angle signal generating portion.

3. The fuel injection control system according to claim 1 or 2, wherein:
   the rapid-change-time required injection setting portion reduces the required number of injections, and then recalculates the required injection times; and
   the injection control portion causes the fuel injection valve to inject the fuel at the required injection times that have been recalculated by the rapid-change-time required injection setting portion.

4. The fuel injection control system according to claim 3, wherein the rapid-change-time required injection setting portion is activated when the rotational speed of the internal combustion engine increases rapidly.

5. The fuel injection control system according to claim 1 or 2, wherein the rapid-change-time required injection setting portion sets the first required injection time, out of said plurality of fuel injections, to the required injection time calculated by the required injection setting portion.

6. A fuel injection control system of an internal combustion engine including a fuel injection valve operable to inject fuel directly into a cylinder and perform a plurality of fuel injections on an intake stroke, and a crank angle signal generating portion that generates a detection signal each time a predetermined crank angle is reached, comprising:

a required injection setting portion that calculates a required number of injections and required injection times with regard to said plurality of fuel injections, based on operating conditions of the internal combustion engine;

a rapid rotational speed change detecting portion that determines whether an amount of change of a rotational speed of the internal combustion engine is equal to or larger than a predetermined value, based on the detection signal received from the crank angle signal generating portion;

a rapid-change-time required injection setting portion that replaces the required injection setting portion to recalculate the required number of injections and the required injection times with regard to said plurality of fuel injections, when the rapid rotational speed change detecting portion determines that the amount of change of the rotational speed of the internal combustion engine is equal to or larger than the predetermined value; and an injection control portion that controls fuel injection of the fuel injection valve based on the results of calculation of the required injection setting portion and the rapid-change-time required injection setting portion, wherein:

the rapid-change-time required injection setting portion converts each of the required injection times into an elapsed time from a signal-receiving point of receiving the detection signal immediately before reaching said each of the required injection times; and the injection control portion causes the fuel injection valve to inject fuel when the elapsed time elapses from the signal-receiving point of receiving the detection signal immediately before reaching said each of the required injection times.

7. A fuel injection control system of an internal combustion engine including a fuel injection valve operable to inject fuel directly into a cylinder and perform a plurality of fuel injections on an intake stroke, and a crank angle signal generating portion that generates a detection signal each time a predetermined crank angle is reached, comprising:

a required injection setting portion that calculates a required number of injections and required injection times with regard to said plurality of fuel injections, based on operating conditions of the internal combustion engine;

a rapid rotational speed change detecting portion that determines whether an amount of change of a rotational speed of the internal combustion engine is equal to or larger than a predetermined value, based on the detection signal received from the crank angle signal generating portion;

a rapid-change-time required injection setting portion that replaces the required injection setting portion to recalculate the required number of injections and the required injection times with regard to said plurality of fuel injections, when the rapid rotational speed change detecting portion determines that the amount of change of the rotational speed of the internal combustion engine is equal to or larger than the predetermined value; and an injection control portion that controls fuel injection of the fuel injection valve based on the results of calculation of the required injection setting portion and the rapid-change-time required injection setting portion, wherein:

the rapid-change-time required injection setting portion sets the required number of injections and the required injection times, based on signal-receiving points in time at which respective detection signals are received from the crank angle signal generating portion; and the injection control portion causes the fuel injection valve to inject the fuel at selected ones of the signal-receiving points of the respective detection signals received from the crank angle signal generating portion.

8. The fuel injection control system according to claim 6 or 7, wherein:

the rapid-change-time required injection setting portion reduces the required number of injections, and then recalculates the required injection times; and the injection control portion causes the fuel injection valve to inject the fuel at the required injection times that have been recalculated by the rapid-change-time required injection setting portion.

9. The fuel injection control system according to claim 8, wherein the rapid-change-time required injection setting portion is activated when the rotational speed of the internal combustion engine increases rapidly.

10. The fuel injection control system according to claim 6 or 7, wherein the rapid-change-time required injection setting portion sets the first required injection time, out of said plurality of fuel injections, to the required injection time calculated by the required injection setting portion.

* * * * *